3,329,603
HYDROCRACKING PROCESS EMPLOYING THE FLUIDIZED SYSTEM AND A HIGH BOILING HYDROCARBON FEED OIL
Everett C. Hughes, Shaker Heights, Wilfrid G. Shaw, Maple Heights, and Harold Arthur Strecker, Walton Hills, Ohio, assignors to The Standard Oil Company, Cleveland, Ohio, a corporation of Ohio
Filed Dec. 30, 1964, Ser. No. 422,196
7 Claims. (Cl. 208—111)

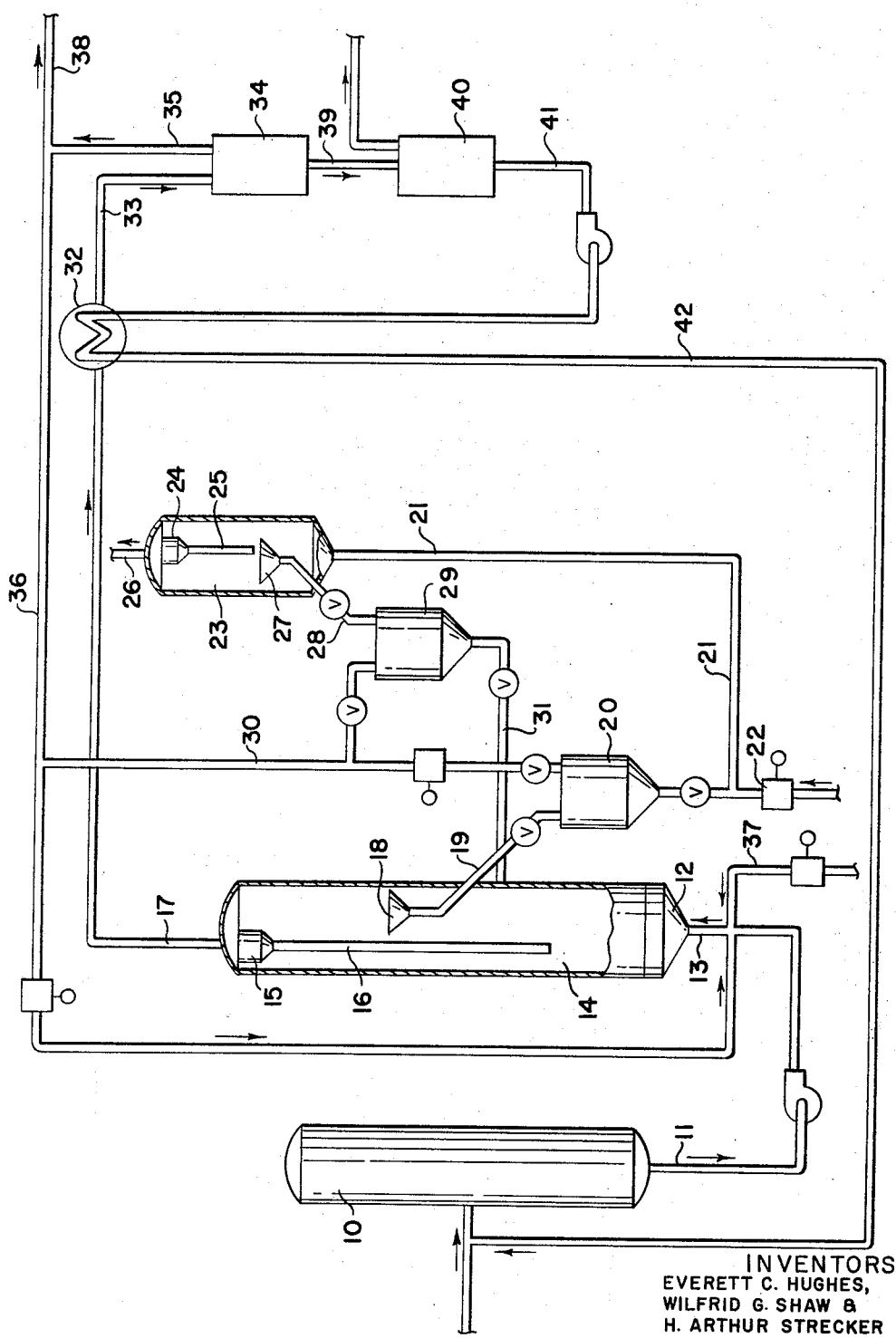

This invention relates to an improved process for treating high boiling petroleum fractions in the presence of a solid catalyst. More particularly, the invention relates to an improved process for catalytically hydrocracking high boiling petroleum fractions (hereinafter referred to as "residuals").

For purposes of this disclosure, "residual" is defined as any hydrocarbon stock some part of which boils above 1000° F. at atmospheric pressure and any 5% fraction of which has a Ramsbottom carbon content of 2 wt. percent or greater.

At the present time there is no commercially attractive process for catalytically hydrocracking residuals. There is, however, a serious need for such a process because the demand for fuel oils into which residuals are most usually converted is on the decrease. This is due in part to recent anti-smog legislation which prohibits the burning of fuel oil in certain metropolitan areas. At the same time, the demand for lighter gasoline stocks is on the increase. Consequently, there is a substantial market for a process which can convert residuals either directly into gasoline stocks or into stocks which can be converted to gasoline by conventional intermediate techniques such as catalytic cracking.

Among the early processes suggested for hydrocracking residuals were those which provided for the contacting of a hydrocarbon mixture in liquid phase with a hydrogenation catalyst under cracking conditions. Here the catalyst was either suspended in a continuous phase of liquid hydrocarbons or the liquid hydrocarbons were contacted with a stationary bed of catalyst. In order to avoid excessive coke formation in the operation of these processes, it was necessary to use extremly high hydrogen pressures of the order of 3,000 p.s.i. or more. This not only entailed high capital and operating cost but the excessive hydrogen pressure tended to cause excessive hydrogenation of aromatic compounds, which in turn contributed to the production of relatively low-quality gasoline stocks.

U.S. Patent 2,700,014 to Anhorn et al. describes a process which is said to be an improvement over the above- described earlier efforts. The Anhorn et al. process provides for contacting between liquid hydrocarbons and catalyst particles while the latter are in a turbulent and suspended condition. The inventors state that the rate of introduction of hydrocarbon mixture into the catalyst zone should be controlled "so that the total amount of liquid in contact with the catalyst particles at any time is less than the total amount which can be absorbed in the pores of the catalyst particles." Finally, the inventors state that if the catalyst particles accumulate enough liquid to form a bridge between the particles, conglomeration will result and the suspended turbulent condition will terminate or become imperfect. This in turn will cause the development of hot spots where the reaction proceeds at an excessive rate and temperature, causing an excessive conversion to gas and coke.

It has now been found, quite surprisingly, in view of the Anhorn et al. patent, that contacting the fluidized catalyst with more liquid than can be absorbed in the pores of the catalyst particles neither conglomerates the suspended catalyst particles nor interferes with their turbulent condition. Even more surprising is the discovery that operations conducted under conditions where the amount of liquid in contact with the catalyst particles is in excess of the amount which can be absorbed in the pores thereof provide a significant reduction in the amount of coke deposited on the catalyst and, in many instances, give better yield distribution and higher conversion than operations under the process described in the Anhorn et al. patent.

Another aspect of the present invention is the discovery that a group of catalysts containing oxides and/or sulfides of cobalt, molybdenum and tungsten supported on an alumina or silica-alumina base are particularly useful for hydrocracking residuals.

A better understanding of the invention may be had by reference to the following detailed description taken together with the accompanying drawing which is a diagrammatic elevation, partly in section, of apparatus in which our invention can be carried out.

In this preferred embodiment, feed material for the catalytic hydrocracking process may be supplied from any suitable source such as crude tower 10. The bottoms from the crude tower are conveyed through line 11 and atomized at 12 into a gas stream 13 containing a high percent hydrogen gas, and sprayed into a fluidized bed of catalyst within a pressured hydrocracking reactor 14.

Catalyst disengagement is accomplished by cyclone 15 in the top of the reactor. The cyclone is of such a design that the catalyst particles are returned to the bottom of the reactor through dipleg 16, while hydrocarbon product passes through and leaves the top of the reactor through line 17.

Deactivated catalyst is collected in funnel 18, removed from the reactor through dipleg 19, and deposited in pressure let-down vessel 20. The pressure in vessel 20 is then reduced to atmospheric pressure and the catalyst is airlifted through line 21, compressed air being supplied at 22, to regenerator 23. Here the catalyst is regenerated by burning off deposited coke, utilizing the air which lifted the catalyst to the regenerator.

The regenerator 23 is provided with a cyclone 24 which separate the catalyst particles from the coke oxidation products and returns the former to the bottom of the regenerator through dipleg 25. The gaseous products of the regenerative process leave as flue gas through line 26.

Regenerated catalyst is collected in funnel 27 and carried through dipleg 28 to pressure let-down vessel 29. The vessel is pressurized to reactor pressure with recycle gas admitted through line 30, and the regenerated catalyst is blown back into the reactor through line 31. Fresh make-up catalyst, as required, may also be introduced into the system through vessel 29 by means forming no part of the invention and therefore not shown.

Where a sulfided catalyst is used, sulfiding of fresh make-up catalyst and resulfiding of regenerated catalyst may be accomplished in vessel 29 by means forming no part of the invention and therefore not shown.

Hydrocarbon effluent leaves the top of reactor 14 through line 17. This stream is partially condensed in heat exchanger 32 and then proceeds through line 33 to a high pressure separator 34. The vapor separated at this stage, being largely hydrogen, is recycled through lines 35 and 36, compressed and fed through line 13 together with make-up hydrogen from line 37, into the bottom of reactor 5. Any vapor not so recycled may be bled off through line 38 to light ends recovery facilities forming no part of the invention and therefore not shown.

Liquid from high pressure separator 34 is flashed through line 39 into low pressure separator 40. The vapor from this separator, being largely the butanes and lighter material, is bled off through line 41 to light ends recovery facilities forming no part of the invention and therefore not shown. The liquid hydrocracked product from separator 40 passes through line 41, exchanger 32, where it is heated with reactor effluent, line 42, and thence to further refining, via crude tower 10.

It will be understood that the process of the invention may be carried out in equipment other than that just described. For instance, instead of transferring catalyst to and from the regenerator through pressure let-down vessels, the regenerators may be operated at reactor pressure, thus obviating the need for let-down vessels.

As another alternative, the process may be conducted in two or more parallel reactor vessels which double as regenerators. While one such vessel is being utilized as a reactor, the catalyst in another can be regenerated.

Still other equipment modifications will readily occur to those having ordinary skill in the art.

IMPROVED PROCESS

The improved process has for its object the catalytic hydrocracking of residuals into more valuable, lower-boiling hydrocarbons.

The improved process may be conducted under various operating conditions so long as two critical factors are observed: the catalyst must be in a fluidized state and the total amount of liquid hydrocarbon in contact with the catalyst must be greater than the total amount of liquid which will be absorbed in the pores of the catalyst and less than the total amount of liquid which will flood the catalyst and create a continuous phase of liquid.

With these two factors observed, the improved process may be conducted by bringing the hydrocarbons into contact with a hydrocracking catalyst, under conditions shown in the following table:

| Process Variable | General Limits | Preferred Range |
| --- | --- | --- |
| Temperature, °F | 750–950 | 800–925 |
| Total Pressure, p.s.i.g | 1,000–3,000 | 1,500–2,500 |
| WHSV | 0.4–3.0 | 0.5–2.0 |
| Total Recycle Ratio, s.c.f.b | [1] 5,000–150,000 | 10,000–30,000 |
| Vol. Percent $H_2$ in Recycle | >70 | 75–90 |

[1] Applicable primarily to small reactors.

Any finely divided, porous, hydrocracking catalyst can be employed in practicing the improved process. Examples of suitable catalysts include molybdenum, tungsten, vanadium, chromium, cobalt, nickel, iron and tin, their oxides and sulfides on a cracking support. Mixtures of these supported materials or compounds of two or more of their oxides or sulfides may also be employed. For instance, mixtures or compounds of the iron group metal oxides or sulfides with the oxides or sulfides of Group VI, left column of the periodic table, constitute satisfactory catalysts. Examples of such mixtures or compounds are nickel molybdate, tungstate or chromate (or thio molybdate, thio tungstate or thio chromate) or mixtures of nickel oxide with molybdenum, tungsten or chromium oxides.

These materials are advantageously deposited upon or otherwise composited with a porous cracking carrier such as activated alumina, various synthetic silica-alumina mixtures, or natural silica-alumina type cracking catalysts, or other refractory materials having a large surface area. The composite hydrocracking catalyst is prepared by known techniques such as by impregnating the carrier particles with a solution of a compound or salt of the desired metal component followed by drying and calcining (and reduction if a reduced catalyst is to be used).

PREFERRED CATALYSTS

A preferred group of catalysts for hydrocracking residuals are those consisting essentially of 20–38 wt. percent $WO_3$, 7–15 wt. percent $MoO_3$, 0–5 wt. percent NiO, 0–5 wt. percent CoO, and 0–5 wt. percent HF, the remainder being a cracking support consisting essentially of 100–50 wt. percent alumina and 0–50 wt. percent silica. The sulfided counterparts of these catalysts can also be used very advantageously.

These catalysts can be prepared by conventional techniques as by impregnating the cracking support with a solution of any compound or salt of the metal component, though not necessarily with equivalent results, followed by drying and calcining. HF, where desired in the finished catalyst, may be added at any stage, but is preferably added after calcining.

Sulfiding may be conducted as part of the catalyst preparation procedure but is preferably initially effected and maintained in the hydrocracking process equipment. $H_2S$ makes a very suitable source of sulfur.

Even where the oxide form of catalyst is initially used for hydrocracking, it will convert at least partially to the sulfided form under the influence of the sulfur content of the residual material being cracked.

A series of sixteen catalysts, listed in the table below, were prepared and tested for hydrocracking activity. Some of these catalysts have compositions falling within the limits of the preferred group defined above, and others have compositions falling outside the limits of the preferred group.

A sample of each catalyst was tested in a fixed bed laboratory microreactor operated at 850° F., a total pressure of 900 p.s.i.g., and a hydrogen rate within the range of 15,000 to 25,000 standard cubic feet per barrel of feed (s.c.f.b.).

Catalyst compositions 1–13 were used to treat a typical "pipeline" reduced crude having the inspection shown in Table A below. These runs were conducted at a liquid hourly space velocity (LHSV) within the range of 0.5–0.6.

Catalyst compositions 14–16 were used to treat a heavier, California atmospheric reduced crude having the inspections shown in Table B below. These runs were conducted at a weight hourly space velocity (WHSV) of 1.0.

| | Catalyst Composition | Percent Liquid Product Boiling Below 600° F. | | | Rating |
| --- | --- | --- | --- | --- | --- |
| | | 2d Hour | 3d Hour | 4th Hour | |
| 1 | 25% $WO_3$-9% $MoO_3$-$Al_2O_3$ | 86 | 82 | 64 | Good. |
| 2 | 25% $WO_3$-9% $MoO_3$-6.5% $SiO_2$-$Al_2O_3$ | 92 | 86 | 72 | Do. |
| 3 | 25% $WO_3$-9% $MoO_3$-33% $SiO_2$-$Al_2O_3$ | 87 | 80 | 71 | Do. |
| 4 | 25% $WO_3$-9% $MoO_3$-66% $SiO_2$ | 37 | 31 | 29 | Poor. |
| 5 | 15% $WO_3$-11% $MoO_3$-$Al_2O_3$ | 66 | 43 | 39 | Do. |
| 6 | 50% $WO_3$-6% $MoO_3$-$Al_2O_3$ | 77 | 71 | 55 | Do. |
| 7 | 38% $WO_3$-8% $MoO_3$-2.2% CoO-$Al_2O_3$ | 95 | ~80 | | Good. |
| 8 | 25% $WO_3$-9% $MoO_3$-2.6% CoO-$Al_2O_3$ | 94 | 83 | 69 | Do. |
| 9 | 12.5% $MoO_3$-3.5% CoO-$Al_2O_3$ | 39 | | | Poor. |
| 10 | 25% $WO_3$-19% $MoO_3$-$Al_2O_3$ | 83 | 65 | 45 | Do. |
| 11 | 25% $WO_3$-$Al_2O_3$ | 83 | 58 | 47 | Do. |
| 12 | 25% $WO_3$-9% $MoO_3$-2.5% CoO-3% HF-$Al_2O_3$ | 85 | 78 | 70 | Good. |
| 13 | 15% $WO_3$-10% $MoO_3$-2.8% CoO-6% HF-$Al_2O_3$ | 73 | 70 | 46 | Poor. |
| 14 | 25% $WO_3$-9% $MoO_3$-2.5% CoO-$Al_2O_3$ | 53 | 51 | 34 | Good. |
| 15 | 25% $WO_3$-9% $MoO_3$-2.5% CoO-2.5% NiO-$Al_2O_3$ | 50 | 43 | 38 | Do. |
| 16 | 25% $WO_3$-9% $MoO_3$-2.5% NiO-$Al_2O_3$ | 57 | 46 | 39 | Do. |

In each instance the percentages given are by weight of catalyst. The percentages for $Al_2O_3$ are not reported but it will be understood that this material makes up the balance of the catalyst.

The table reports the percent conversion of feed to liquid product for the second, third, and fourth hours of operation, and an over-all rating of "good" or "poor" based on the level of conversion and the ability of the catalyst to maintain a high level of conversion throughout the length of the test. The "good" ratings assigned the comparatively low conversion levels for catalysts 14-16 are explained by the fact that the California crude treated is much more difficult to crack than the "pipeline" crude used with catalysts 1-13.

Comparing catalysts 1, 5, and 6, it will be apparent that a preferred catalyst will contain more than 15 wt. percent and less than 50 wt. percent $WO_3$.

Catalysts 1, 10, and 11 show the need for $MoO_3$, but in amounts below 19 wt. percent.

Catalysts 1, 2, 3, and 4 show that the presence of some $SiO_2$ together with $Al_2O_3$ slightly enhances activity when compared with a catalyst containing only $Al_2O_3$ as the cracking support, but that replacing all of the $Al_2O_3$ with $SiO_2$ produces a poor catalyst.

Similar comparisons of other listed catalysts will show that the presence of small amounts of CoO, NiO, and HF are useful but not essential to achieve a "good" rating.

TABLE A.—INSPECTIONS FOR TYPICAL "PIPELINE" REDUCED CRUDE

| | |
|---|---|
| Gravity, ° API | 17.5 |
| Conradson carbon, percent | 9.3 |
| Nitrogen, total, percent | 0.37 |
| Nitrogen, basic, p.p.m. | 1084 |
| Sulfur, percent | 0.52 |
| Vac. Engler: | |
| IBP, ° F. | 617 |
| 5.3% | 773 |
| 10.7 | 818 |
| 21.3 | 869 |
| E.P. (distillation discontinued) | 893 |
| Dist. (to 893°), percent | 27.7 |
| Residue, percent | 73.9 |

TABLE B.—INSPECTIONS FOR CALIFORNIA ATMOSPHERIC REDUCED CRUDE

| | |
|---|---|
| Gravity, ° API | 13.7 |
| Total sulfur, wt. percent | 1.73 |
| Total nitrogen, wt. percent | 0.887 |
| Basic nitrogen, p.p.m. | 2225 |
| Ramsbottom carbon, percent | 7.6 |
| ASTM distillation, ° F.: | |
| IBP | 492 |
| 5% | 592 |
| 20% | 745 |
| 40% | 854 |
| 60% | 975 |

The examples below show comparisons between the improved process of this invention and the Anhorn et al. process. As previously noted, the fundamental difference between the two processes resides in the amount of liquid hydrocarbons in contact with the catalyst particles vis-a-vis the absorptive capacity of the catalyst particles. Specifically, the Anhorn et al. process is conducted at a feed rate such that the total amount of liquid in contact with the catalyst particles at any time is less than the total amount which can be absorbed in the pores of the catalyst particles: the improved process of the present invention is conducted at a feed rate such that the total amount of liquid in contact with the catalyst particles is greater than the total amount of liquid which will be absorbed in the pores of the catalyst, and less than the total amount of liquid which will flood the catalyst and create a continuous phase of liquid.

In order to establish that the absorptive capacity of the catalyst particles was exceeded during operations conducted in accordance with the present invention and not exceeded during operations in accordance with the teachings of the Anhorn et al. patent, the following experimental procedure was devised for determining the extent to which the catalyst pores were filled with liquid under hydrocracking conditions:

Since the hydrocarbon liquid is reactive with the catalyst under hydrocracking conditions, it was not possible to make a direct quantitative analysis. Thus, it was necessary to remove a portion of the catalyst from the hydrocracking zone and rapidly cool it under such conditions (e.g., under a nitrogen blanket) that further reaction of the liquid hydrocarbon with the catalyst was kept to a minimum.

The next step was to determine the amount of liquid hydrocarbon contained in the catalyst pores, with both the catalyst and hydrocarbon at room temperature. This was accomplished by successive extractions with pentane and benzene. Knowing the volume of liquid removed from the catalyst and the density of the liquid, both at room temperature, it was then possible to calculate the volume of liquid per gram of the catalyst. Then, knowing the gravity of the liquid at the hydrocracking reaction temperature, it was possible to calculate the volume which that amount of liquid occupied at reaction temperature. Assuming that the pore volume of the catalyst remains constant throughout the temperature range under consideration (that is not an unreasonable assumption because the liquid hydrocarbon expands about 15 to 20 times as much as does the catalyst), it was then determined whether or not, at hydrocracking reaction temperature, the volume of liquid hydrocarbon exceeded the port volume of the catalyst.

Since the reactors used in the laboratory were glass, it was a simple matter of visual observation to determine that the total amount of liquid in contact with the catalyst particles was less than that amount which would flood the catalyst and create a continuous phase of liquid. In non-transparent equipment a flooded situation would show up as a sharp drop in product quality, indicating that a substantial amount of liquid feed was passing through the catalyst without being cracked.

By applying these procedures to the experimental reactors employed below, it was possible to determine whether or not, for a given set of reactor operating conditions, the absorptive capacity of the catalyst was exceeded but not so far exceeded as to flood the catalyst and create a continuous phase of liquid.

*Example I*

For purposes of comparing the two processes, the experimental procedure described in Example III of the Anhorn et al. patent was chosen because Baxterville crude used therein was readily available while the Kuwait crude used in Examples I and II was not.

Two runs were made, both using the nickel tungstate silica-alumina catalyst described in Example III of the Anhorn et al. patent and a Baxterville crude having the inspections shown below. The first run utilized the operating conditions described in Example III of the patent, and a second run utilized preferred operating conditions of the improved process constituting the present invention.

The nickel tungstate catalyst was prepared as follows: 10.9 g. of $Ni(NO_3)_2 \cdot 6H_2O$ and 11.1 g. of ammonium metatungstate (83.91% $WO_3$) were weighed out and dissolved in 337 ml. of distilled water.

The above solution was added to 262.0 g. of a commercially available silica-alumina cracking catalyst consisting of 75% $SiO_2$ and 25% $Al_2O_3$. The impregnated catalyst was stirred for 5 to 10 minutes and placed in a 120° C. oven and dried for 4 hours at this temperature with occasional stirring. The dried catalyst was then calcined for 4 hours in air at 1000° F. This provided a catalyst containing 1.15% NiO and 3.85% WO₃ on a silica-alumina base.

A charge of this catalyst was placed in a fluid reactor measuring 2 inches in diameter and 60 inches in length. Then, following the teachings of Example III of the Anhorn et al. patent, the reactor was sealed and pressured with nitrogen at a pressure of 1000 p.s.i. and a temperature of about 850° F. Hydrogen at the rate of about 9000 cubic feet per barrel and Baxterville crude were preheated and charged to the reactor at a space velocity of .47 (wt. oil/wt. cat./hr.).

Feed was passed over the catalyst for 8 hours. The first 3 hours were considered as prerun to line out the unit, condition the catalyst, etc. The last 5 hours were considered as "the run," and the liquid yields product analysis and product conversion were obtained from the product collected during this time.

The liquid product and off-gas passed through a stainless steel filter at the top of the reactor, through a cooling coil, to a liquid-gas separator-receiver which was drained periodically. External cooling of the collected product was made when necessary. The off-gas passed through a back pressure regulator, a cold finger cooled with liquid nitrogen, through a carbon trap, and finally, a gas meter before being vented.

After the 8 hours, the oil feed was stopped, and the reactor system purged with hydrogen at the same flow rate and at the same temperature and pressure used during the run.

Analyses of the product of the 5-hour run were performed by gas chromatography for percent conversion in liquid product at various end points.

A second run was made using the identical catalyst and identical crude source but utilizing the operating conditions of the present invention. These included a temperature of 850° F., a pressure of 2000 p.s.i.g., and a space velocity of 1.0 (wt. oil/wt. cat./hr.). The total amount of liquid brought in contact with the catalyst was greater than the total amount of liquid which could be absorbed in the pores of the catalyst and less than the total amount of liquid which would have flooded the catalyst and created a continuous phase of liquid. Again, the reactor was on stream for a total time of 8 hours with the last 5 hours constituting "the run."

The results of these two runs are shown in the following table:

|  | Process Conditions | |
|---|---|---|
|  | Anhorn et al. | Present Invention |
| Liquid Yield: |  |  |
| Vol. percent | 68.2 | 79.9 |
| Wt. percent | 59.4 | 75.6 |
| Wt. Percent Feed as Carbon on Catalyst | 5.3 | 1.1 |
| Percent Liquid Product Converted to— |  |  |
| 400° F | 75–80 | 56 |
| 600° F | 95 | 88 |
| 725° F | 100 | 100 |

These data show that operations under the conditions of the improved process of the present invention substantially increase the percent liquid yield and even more significantly reduced by almost 80% the weight percent of feed deposited as carbon on the catalyst.

INSPECTION DATA OF BAXTERVILLE CRUDE

Gravity:
 °API _____ 17.2
 Sp. gr. _____ 0.9514

Viscosity, cs.:
 100° F. _____ 628
 210° F. _____ 34.8
Color _____ Black
Carbon residue, percent on material above 590°
 F. _____ 14.6
Sulfur, percent _____ 2.73
Distillation:
 Percent at 392° F. _____ 5.4
 Percent at 500° F. _____ 6.0
 Percent at 590° F. _____ 6.0
 Recovery, percent _____ 6.0
 Residue, percent _____ 92.7
 Loss, percent _____ 1.3

*Example II*

A further improvement in both the Anhorn et al. process and the process of the present invention can be achieved by utilizing a preferred catalyst of this invention. The catalyst so utilized was prepared in the following manner:

An aqueous solution of aluminum chloride was prepared by dissolving 1042 g. of AlCl₃·6H₂O in 1220 ml. of distilled water. This solution was then added with constant stirring to 2060 ml. of 1:1 ammonium hydroxide (one part H₂O:one part conc. NH₄OH) during a 30-minute period. The resulting precipitate was covered with water and aged for 30 minutes. The gel was then diluted with water to provide a consistency suitable for spray drying. The resulting suspension was then spray dried and following this was purified by washing with 1% NH₄OH. The gel was then dried for 16 hours at 120° C.

A solution was prepared by dissolving 40 g. of

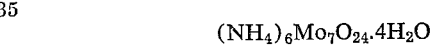

$(NH_4)_6Mo_7O_{24} \cdot 4H_2O$ in 150 ml. of warm water. To this was added 105.6 g. of (NH₄)₆H₂W₁₂O₄₀·xH₂O (85% WO₃) and 35.4 g. of Co(NO₃)₂·6H₂O. This solution was added to the spray-dried alumina with stirring and the impregnated alumina was dried for 16 hours at 120° C. and then calcined for 4 hours in air at 1100° F. The resulting catalyst had the following composition: 25.3% WO₃, 9.3% MoO₃, 2.6% CoO, and 62.8% Al₂O₃, all percents being by weight of total catalyst.

The reactor described in Example I was charged with a portion of this catalyst. The reactor was sealed and flushed with nitrogen while being heated to a temperature of 572° F. The catalyst was then sulfided for 1 hour at this temperature with a mixture consisting of 7.5% H₂S and 92.5% H₂. Following this, the reactor was heated to a temperature of 900° F., and pressurized to run pressure (1000 p.s.i.g. for the Anhorn et al. process and 2000 p.s.i.g. for the process of the present invention) for 1 hour and then cooled to the run temperature (about 845–850° in both cases).

The other operating conditions for the two processes were the same as described in Example I. The results of the two runs were as follows:

|  | Process Conditions | |
|---|---|---|
|  | Anhorn et al. | Present Invention |
| Liquid Yield: |  |  |
| Vol. percent | 85.7 | 94.6 |
| Wt. percent | 74.2 | 84.2 |
| Wt. Percent Feed as Carbon on Catalyst | 3.7 | 0.8 |
| Percent Liquid Product Converted to— |  |  |
| 400° F | 60–70 | 35 |
| 600° F | 95 | 78 |
| 725° F | 100 | 100 |

Comparing these data with the results given in Example I above, it will be seen that the use of the preferred catalyst improves both processes with respect to liquid yield as well as a reduction in the wt. percent feed as carbon on the catalyst. The preferred catalyst increased the liquid yield of the Anhorn et al. process on a volume and weight basis by about 20% and reduced the wt. percent feed as carbon on the catalyst by better than 30%. The preferred catalyst also enhanced the process of the present invention by increasing the liquid yield on a vol. percent basis by about 15% and on a wt. percent basis by about 10%. The wt. percent feed as carbon on catalyst was also reduced by better than 25%.

*Example III*

A hydrocracking catalyst consisting of 25.3% $WO_3$, 9.3% $MoO_3$, 2.6% $CoO$, and 62.8% $Al_2O_3$ (all percents by weight of catalyst) was charged to a pilot plant reactor measuring 3 inches in diameter by 10 feet long.

The reactor was then sealed and flushed with nitrogen while being heated to 572° F. Following this, the catalyst was sulfided for 5 hours with a mixture consisting of 5.4% $H_2S$ and 94.6% $H_2$.

The reactor was then heated to a temperature of 849° F., pressured to 2100 p.s.i.g. and charged with a California vacuum bottoms having the following inspections:

Properties:
| | |
|---|---|
| Gravity, ° API | 8.0 |
| Gravity, specific | 1.0143 |
| Total sulfur, wt. percent | 2.25 |
| Total nitrogen, wt. percent | 1.05 |
| Basic nitrogen, p.p.m. | 2779 |
| Total oxygen, wt. percent | 0.71 |
| Ramsbottom carbon, wt. percent | 14.2 |
| Metals, p.p.m.: | |
| V | 101 |
| Ni | 112 |
| Fe | 70 |
| $C_5$ insolubles, wt. percent | 13.1 |
| Viscosity, cs.: | |
| 210° F. | 777 |
| 300° F. | 95 |
| ASTM distillation: | |
| IBP | 630 |
| 2% | 726 |
| 5% | 825 |
| 10% | 884 |
| 20% | 936 |
| 30% | 953 |
| 40% | — |
| 50% | — |
| 60% | — |

Operating conditions included the following:

| | |
|---|---|
| Space velocity, WHSV | 1.10 |
| Total recycle, s.c.f.b. | 30,400 |
| Hydrogen consumption, s.c.f.b. | 1,390 |
| Mass velocities, lb./hr.-ft.$^2$: | |
| Gas | 300 |
| Liquid | 230 |
| Total | 530 |
| Linear velocity, ft./sec. | 0.11 |
| Hydrogen purity, percent: | |
| Entering reactor | 80.4 |
| Leaving reactor | 78.8 |
| Run length—wt. balance, hrs. | 7.5 |
| Cumulative run length, hrs. | 11.5 |

Catalyst:
| | |
|---|---|
| Weight, lbs. | 11.4 |
| Volume, gals. | 2.09 |
| Bed depth, feet | 5.1 |

The hydrocracked product had the following inspections:

| | |
|---|---|
| Total liquid product, gravity, ° API | 31.7 |
| Yields—Fixed gases (wt. percent): | |
| $H_2S$ | 0.4 |
| $NH_3$ | <0.1 |
| $C_1$ | 1.7 |
| $C_2$'s | 1.2 |
| $C_3$'s | 1.3 |
| Yields—Liquid products (vol. percent): | |
| $C_4$'s | 2.2 |
| $C_5$'s | 1.9 |
| $C_6$–200° F. | 6.7 |
| 200–400° F. | 20.6 |
| 400–550° F. | 23.2 |
| 550–625° F. | 11.3 |
| 625–800° F. | 30.4 |
| 800° F.+ | 16.3 |
| $C_4+$ | 112.6 |
| $C_5+$ | 110.4 |
| $C_6+$ | 108.5 |
| Material balance, wt. percent | 92.3 |

*Example IV*

A mixture of 84 wt. percent fresh and 16 wt. percent regenerated hydrocracking catalyst having the same composition as used in Example III was charged to a pilot plant reactor measuring 3 inches in diameter by 10 feet long.

The reactor was then sealed and flushed with nitrogen while being heated to 572° F. Following this, the catalyst was sulfided for 24 hours with a mixture consisting of 7.5% $H_2S$ and 92.5% $H_2$.

The reactor was then heated to a temperature of about 849° F. and pressured to about 2060 p.s.i.g. and charged with a Wyoming vacuum bottoms having the following inspections:

Properties:
| | |
|---|---|
| Gravity, ° API | 6.3 |
| Gravity, specific 60/60 | 1.0269 |
| Total sulfur, wt. percent | 4.36 |
| Total nitrogen, wt. percent | 0.635 |
| Basic nitrogen, p.p.m. | 1647 |
| Total oxygen, wt. percent | 0.60 |
| Ramsbottom carbon, wt. percent | 17.4 |
| Metals, p.p.m.: | |
| V | 221 |
| Ni | 60 |
| Fe | 22 |
| $C_5$ insolubles, wt. percent | 8.25 |
| Viscosity, cs.: | |
| 210° F. | 1400 |
| 300° F. | 135 |
| Carbon, wt. percent | 84.30 |
| Hydrogen, wt. percent | 10.14 |
| Molecular weight | 808 |
| ASTM distillation: | |
| IBP | 621 |
| 2 percent | 799 |
| 5 percent | 870 |
| 10 percent | 912 |
| 20 percent | 942 |
| 25 percent | 947 |

The unit was operated without catalyst regeneration for 74 hours. Average operating conditions for the 4th–8th, 9th–16th, 27th–34th, 47th–54th, and 67th–74th hours on stream were as follows:

| Hours on Stream | 4th–8th | 9th–16th | 27th–34th | 47th–54th | 67th–74th |
|---|---|---|---|---|---|
| Temperature, °F | 849 | 850 | 847 | 844 | 846 |
| Pressure, p.s.i.g. | 2,075 | 2,065 | 2,050 | 2,050 | 2,060 |
| Space Velocity, WHSV | 0.49 | 0.50 | 0.51 | 0.51 | 0.51 |
| Recycle Ratios, s.c.f.b.: | | | | | |
| Total | 95,500 | 91,600 | 84,100 | 87,200 | 87,600 |
| Hydrogen | 87,500 | 84,000 | 75,200 | 78,100 | 78,800 |
| Mass Velocities (Lb./Hr.-Ft.²): | | | | | |
| Liquid | 107 | 110 | 111 | 111 | 111 |
| Gas | 311 | 315 | 300 | 302 | 293 |
| Linear Velocity (Ft./Sec.) | 0.14 | 0.14 | 0.13 | 0.13 | 0.13 |
| Hydrogen Purity, Percent: | | | | | |
| Entering Reactor | 0.92 | 0.92 | 0.89 | 0.90 | 0.90 |
| Leaving Reactor | 0.91 | 0.91 | 0.89 | 0.89 | 0.89 |
| Run Length—Wt. Balance, Hrs | 4 | 6.5 | 6 | 6 | 6 |
| Cumulative Run Length, Hrs | 8 | 16 | 34 | 54 | 74 |

The hydrocracked product collected during the periods indicated had the following inspections:

| Hours on Stream | 4th–8th | 9th–16th | 27th–34th | 47th–54th | 67th–74th |
|---|---|---|---|---|---|
| Total Liquid Product Gravity, °API | 39.0 | 35.5 | 32.4 | 32.6 | 33.3 |
| Yields—Fixed Gases (Wt. Percent): | | | | | |
| $NH_3$ | | 0.1 | 0.6 | | 0.4 |
| $H_2S$ | | 2.4 | 3.3 | | 4.2 |
| $C_1$ | | 1.9 | 2.5 | | 3.8 |
| $C_2$'s | | 1.9 | 2.3 | | 3.1 |
| $C_3$'s | | 2.4 | 2.9 | | 3.8 |
| Yields—Liquid Products (Vol. Percent): | | | | | |
| $C_3$'s | | 4.9 | 5.9 | | 7.6 |
| $C_4$'s | | 4.4 | 4.8 | | 5.4 |
| $C_5$'s | | 2.5 | 2.3 | | 2.2 |
| $C_6$–200° F | | 5.8 | 3.9 | | 4.6 |
| 200–400° F | | 21.9 | 19.3 | | 17.7 |
| 400–550° F | | 22.9 | 20.3 | | 18.9 |
| 550–625° F | | 15.5 | 11.0 | | 10.5 |
| 625–800° F | | 27.3 | 27.5 | | 24.7 |
| 800° F+ | | 11.6 | 17.0 | | 18.3 |
| Material Balance, Wt. Percent | 97.2 | 93.3 | 99.0 | 98.8 | 97.4 |

For the entire 74-hour run, only 7.63 wt. percent carbon was collected on the catalyst. Based on the total Wyoming vacuum bottoms fed to the reactor, the average conversion of feed to coke was 0.20 wt. percent.

We claim:

1. In a process for catalytically hydrocracking high boiling petroleum hydrocarbons to lower boiling products the steps of:
   (a) charging a reactor with a finely divided, porous hydrocracking catalyst,
   (b) introducing into said reactor and fluidizing said catalyst with a gaseous stream rich in hydrogen and containing a dispersion of said high boiling hydrocarbons in liquid and vapor form,
   (c) controlling the amount of liquid high boiling hydrocarbons so introduced, such that the total amount of liquid hydrocarbons in contact with the catalyst is greater than the total amount of liquid which will be absorbed in the pores of the catalyst, and less than the total amount of liquid which will flood the catalyst and create a continuous phase of liquid, and
   (d) conducting the catalytic hydrocracking reaction at a temperature within the range of about 750° F. to about 950° F., a total pressure within the range of about 1000 p.s.i.g. to about 3000 p.s.i.g., and a weight hourly space velocity within the range of about 0.4 to about 3.0.

2. In a process for catalytically hydrocracking a petroleum residual to lower boiling products, the steps of:
   (a) charging a reactor with a finely divided, porous hydrocracking catalyst,
   (b) introducing into said reactor and fluidizing said catalyst with a gaseous recycle stream containing in excess of 70 vol. percent hydrogen in which is dispersed a petroleum residual feed in liquid and vapor form,
   (c) controlling the amount of liquid residual so introduced, such that the total amount of liquid in contact with the catalyst is greater than the total amount of liquid which will be absorbed in the pores of the catalyst, and less than the total amount of liquid which will flood the catalyst and create a continuous phase of liquid,
   (d) conducting the catalytic hydrocracking reaction at a temperature within the range of about 750° F. to about 950° F., a total pressure within the range of about 1000 p.s.i.g. to about 3000 p.s.i.g., a weight hourly space velocity within the range of about 0.4 to about 3.0, and a gaseous recycle to residual feed ratio within the range of about 5,000 to about 150,000 standard cubic feet per barrel, and
   (e) separating the lower boiling reaction products from a gaseous stream rich in hydrogen and recycling the latter to said reactor.

3. The process of claim 2 in which the hydrocracking catalyst is selected from the group consisting of (1) catalysts containing from about 20 wt. percent to about 38 wt. percent $WO_3$, from about 7 wt. percent to about 15 wt. percent $MoO_3$, from 0 to about 5 wt. percent CoO, 0 to about 5 wt. percent NiO, and from 0 to about 5 wt. percent HF (all percents by weight of total catalyst) on a cracking support consisting essentially of 100–50 wt. percent alumina and 0–50 wt. percent silica, and (2) the sulfided counterparts of these catalysts.

4. In a process for catalytically hydrocracking high boiling petroleum hydrocarbons to lower boiling products, the steps of:
   (a) charging a reactor with a finely divided, porous hydrocracking catalyst, selected from the group consisting of (1) catalysts containing from about 20 wt. percent to about 38 wt. percent $WO_3$, from about 7 wt. percent to about 15 wt. percent $MoO_3$, from 0 to about 5 wt. percent CoO, from 0 to about 5 wt. percent NiO, and from 0 to about 5 wt. percent HF (all percents by weight of total catalyst) on a cracking support consisting essentially of 100–50 wt. percent alumina and 0–50 wt. percent silica, and (2) the sulfided counterparts of these catalysts,
   (b) introducing into said reactor and fluidizing said catalyst with a gaseous recycle stream containing from about 75 vol. percent to about 95 vol. percent hydrogen, in which is dispersed a high boiling hydrocarbon feed in liquid and vapor form, (c) controlling the amount of liquid high boiling hydrocarbon feed so introduced, such that the total amount of liquid hydrocarbon in contact with the catalyst is greater than the total amount of liquid which will be absorbed in the pores of the catalyst, and less than the total amount of liquid which will flood the catalyst and create a continuous phase of liquid,
(d) conducting the catalytic hydrocracking reaction at a temperature within the range of about 800° F. to about 925° F., a total pressure within the range of about 1500 p.s.i.g. to about 2000 p.s.i.g., a weight hourly space velocity within the range of about 0.5 to about 2.0, and a gaseous recycle stream to high boiling hydrocarbon feed ratio of about 10,000 to about 30,000 standard cubic feet per barrel, and
(e) separating the lower boiling reaction products from a gaseous stream rich in hydrogen and recycling the latter to said reactor.

5. The process of claim 4 in which said catalyst is a sulfided form of a catalyst consisting essentially of about 25.3 wt. percent $WO_3$, about 9.3 wt. percent $MoO_3$, about 2.6 wt. percent CoO, and about 62.8 wt. percent $Al_2O_3$, all percents by weight of total catalyst.

6. In a hydrocracking process a catalyst useful for hydrocracking petroleum residuals, consisting essentially of about 25.3 wt. percent $WO_3$, about 9.3 wt. percent $MoO_3$, about 2.6 wt. percent CoO, and about 62.8 wt. percent $Al_2O_3$, all percents by weight of total catalyst.

7. A sulfided form of the catalyst defined in claim 6.

References Cited
UNITED STATES PATENTS

| | | | |
|---|---|---|---|
| 2,700,014 | 1/1955 | Anhorn et al. | 208—108 |
| 3,183,180 | 5/1965 | Schuman et al. | 208—110 |

DELBERT E. GANTZ, *Primary Examiner.*

A. RIMENS, *Assistant Examiner.*